United States Patent
Yoon et al.

(10) Patent No.: US 11,256,134 B2
(45) Date of Patent: Feb. 22, 2022

(54) BACKLIGHT UNIT AND DISPLAY DEVICE USING THE SAME

(71) Applicant: LG Display Co., Ltd., Seoul (KR)

(72) Inventors: HyeokJoon Yoon, Paju-si (KR); KiSeong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/122,851

(22) Filed: Dec. 15, 2020

(65) Prior Publication Data

US 2021/0200030 A1    Jul. 1, 2021

(30) Foreign Application Priority Data

Dec. 30, 2019 (KR) .......................... 10-2019-0177565

(51) Int. Cl.
  *G02F 1/00* (2006.01)
  *G02F 1/13357* (2006.01)

(52) U.S. Cl.
  CPC .. *G02F 1/133605* (2013.01); *G02F 1/133603* (2013.01)

(58) Field of Classification Search
  CPC ......... G02F 1/133603; G02F 1/133606; G02F 1/133605
  See application file for complete search history.

(56) References Cited

U.S. PATENT DOCUMENTS

| | | | | |
|---|---|---|---|---|
| 10,969,628 | B1* | 4/2021 | Zweigle | G02F 1/133606 |
| 2007/0070625 | A1* | 3/2007 | Bang | G02F 1/133605 |
| | | | | 362/240 |
| 2014/0092584 | A1* | 4/2014 | Ono | G02F 1/133611 |
| | | | | 362/97.1 |
| 2015/0159834 | A1* | 6/2015 | Chang | G02F 1/133603 |
| | | | | 362/97.1 |
| 2015/0219936 | A1* | 8/2015 | Kim | G02F 1/133602 |
| | | | | 362/97.1 |
| 2017/0219881 | A1* | 8/2017 | Shin | G02F 1/133608 |
| 2018/0023784 | A1* | 1/2018 | Tamura | F21V 7/0083 |
| | | | | 362/235 |
| 2018/0188606 | A1* | 7/2018 | Lee | G02F 1/1339 |
| 2018/0217449 | A1* | 8/2018 | Mifune | G02F 1/133603 |
| 2019/0094616 | A1* | 3/2019 | Kim | G02B 6/0055 |
| 2020/0393611 | A1* | 12/2020 | Ryu | G02B 6/0061 |

* cited by examiner

*Primary Examiner* — Gerald J Sufleta, II
(74) *Attorney, Agent, or Firm* — Seed IP Law Group LLP

(57) ABSTRACT

Embodiments of the present disclosure include a backlight unit and a display device using the backlight unit comprising a plurality of light emitting elements disposed on a substrate and each having a flip chip structure. A reflector is disposed between the plurality of light emitting elements and includes a plurality of grooves each having a predetermined size on an upper surface of the reflector. A transparent sheet is disposed on the reflector and the plurality of light emitting elements and includes a plurality of optical path changing patterns disposed at positions overlapping the plurality of light emitting elements on an opposite side of a surface of the transparent sheet adjacent to the plurality of light emitting elements and each having a central region thicker than an outer region.

20 Claims, 11 Drawing Sheets

BACKLIGHT UNIT AND DISPLAY DEVICE USING THE SAME

CROSS REFERENCE TO RELATED APPLICATION

This application claims priority from Korean Patent Application No. 10-2019-0177565, filed on Dec. 30, 2019, which is hereby incorporated by reference for all purposes as if fully set forth herein.

BACKGROUND

Technical Field

Embodiments of the present disclosure relate to a backlight unit and a display device including the backlight unit.

Description of the Related Art

As the information society develops, the demand for display devices for displaying images is increasing in various forms. Various types of display devices such as a liquid crystal display device (LCD), and an organic light emitting display device (OLED) have been used for this purpose.

The display device may include the backlight unit and may display the image in response to light emitted from the backlight unit. The display device may utilize a light emitting diode (LED), a cold cathode fluorescent lamp (CCFL), and a hot cathode fluorescent lamp (HCLF) as a light source of the backlight unit. Recently, the light emitting diodes having excellent light efficiency and high color reproducibility are widely used as light sources of the backlight units.

The backlight unit may be classified into an edge-type or a direct-type according to the arrangement of the light source and the transmission mode of light. In the direct-type backlight unit, the light source such as the LED may be disposed on the rear surface of the display device. The light source device used in the direct-type backlight unit may include the light emitting diode, a substrate including the light emitting diode and circuit elements for driving the light emitting diode.

Recently, for display devices employed in smartphones, tablet PCs, etc., there is an increasing demand for the light weight, low power consumption and high light efficiency.

BRIEF SUMMARY

Various embodiments of the present disclosure provide a backlight unit capable of improving image quality and a display device including such a backlight unit.

Various embodiments of the present disclosure provide a backlight unit having a high light efficiency and a display device including the same.

In accordance with one or more embodiments of the present disclosure, there may be provided with a backlight unit comprising: a plurality of light emitting elements disposed on a substrate and each having a flip chip structure; a reflector disposed between the plurality of light emitting elements and having a plurality of grooves each having a predetermined size on an upper surface of the reflector; and a transparent sheet disposed on the reflector and the plurality of light emitting elements and including a plurality of optical path changing patterns disposed at positions overlapping the plurality of light emitting elements, respectively, on an opposite side of a surface of the transparent sheet adjacent to the plurality of light emitting elements and each having a central region thicker than the outer region.

In accordance with one or more embodiments of the present disclosure, there may be provided with a display device comprising: a display panel; and a backlight unit disposed under the display panel and emitting light to the display panel, wherein the backlight unit includes, a plurality of light emitting elements disposed on a substrate and each having a flip chip structure; a reflector disposed between the plurality of light emitting elements and having a plurality of grooves each having a predetermined size on an upper surface of the reflector; and a transparent sheet disposed on the reflector and the plurality of light emitting elements and including a plurality of optical path changing patterns disposed at positions overlapping the plurality of light emitting elements, respectively, on an opposite side of a surface of the transparent sheet adjacent to the plurality of light emitting elements and each having a central region thicker than the outer region.

According to embodiments of the present disclosure, it is possible to provided with the backlight unit capable of improving image quality and the display device including the backlight unit.

According to embodiments of the present disclosure, it is possible to provided with the backlight unit having a high light efficiency and the display device including the backlight unit.

DETAILED DESCRIPTION

Figure 1:
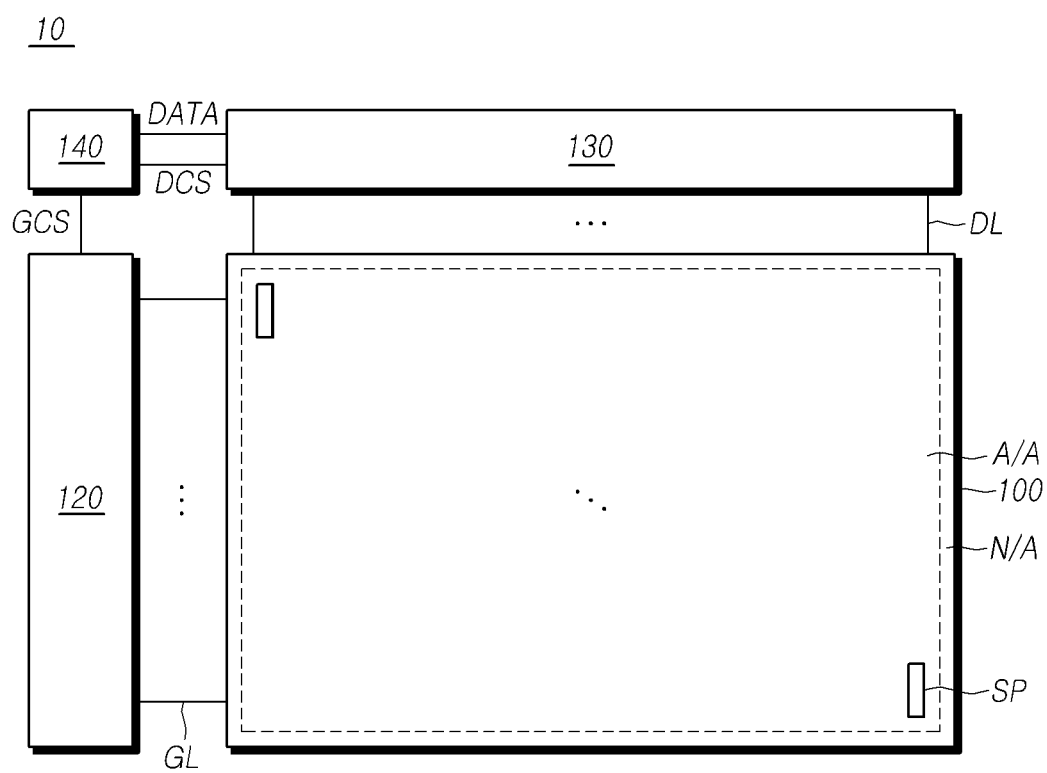
FIG. 1 is a diagram illustrating a schematic configuration of a display device according to embodiments of the present invention.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

FIG. 1 is a diagram illustrating a schematic configuration of a display device according to embodiments of the present disclosure.

Referring to FIG. 1, the display device 10 according to embodiments of the present disclosure may include a display panel 100 including an active area A/A and a non-active area N/A, a gate driving circuit 120 and a data driving circuit 130 for driving the display panel 100, a controller 140 and the like.

In the display panel 100, a plurality of gate lines GL and a plurality of data lines DL may be disposed, and multiple subpixels SP may be located in areas where the gate lines GL and the data lines DL intersect. Also, the display panel 100 may be a liquid crystal panel. The liquid crystal panel may include a pixel electrode, a common electrode, and a liquid crystal layer disposed between the pixel electrode and the common electrode. The liquid crystal layer may display an image by blocking or transmitting light by changing its molecular arrangement in response to a voltage applied to the pixel electrode and the common electrode.

The gate driving circuit 120 may be controlled by the controller 140, and may sequentially output a scan signal to the plurality of gate lines GL arranged on the display panel 100, thereby can control the driving timing of the multiple subpixels SP. The gate driving circuit 120 may include one or more gate driver integrated circuits (GDICs), and may be located on one side of the display panel 100 or on both sides according to a driving method. Each gate driver integrated circuit (GDIC) may be connected to a bonding pad of the display panel 100 by a tape-automated bonding (TAB) method or a chip-on-glass (COG) method, or may be implemented as a gate-in-panel (GIP) type and directly disposed on the display panel 100. Alternatively, each gate driver integrated circuit (GDIC) may be integrated and disposed in the display panel 100. Further, each gate driver integrated circuit (GDIC) may be implemented in a chip on film (COF) method in which each gate driver integrated circuit (GDIC) is mounted on a film connected to the display panel 100 and electrically connected to the display panel 100 through lines on the film.

The data driving circuit 130 may receive image data DATA from the controller 140 and convert the image data DATA to an analog data voltage. The data driving circuit 130 may output the analog data voltage to each data line DL according to the timing at which the scan signal is applied through the gate line GL, so that each subpixel SP can express brightness according to the image data DATA. The data driving circuit 130 may include one or more source driver integrated circuits (SDICs). Each source driver integrated circuit (SDIC) may include a shift register, a latch circuit, a digital-to-analog converter, and an output buffer, however, is not limited thereto.

Each source driver integrated circuit (SDIC) may be connected to the bonding pad of the display panel 100 by the tape automated bonding (TAB) method or the chip-on-glass (COG) method, or directly disposed on the display panel 100, or, in some cases, may be integrated and directly disposed in the display panel 100. In addition, each source driver integrated circuit (SDIC) may be implemented in a chip-on-film (COF) method in which each source driver integrated circuit (SDIC) is mounted on a film connected to the display panel 100 and electrically connected to the display panel 100 through lines on the film.

The controller 140 may supply various control signals to the gate driving circuit 120 and the data driving circuit 130, and can control the operation of the gate driving circuit 120 and the data driving circuit 130. The controller 140 may be mounted on a printed circuit board, a flexible printed circuit, or the like, and may be electrically connected to the gate driving circuit 120 and the data driving circuit 130 through a printed circuit board, a flexible printed circuit, or the like. The controller 140 may control the gate driving circuit 120 to output the scan signal according to the timing implemented in each frame, and may output the converted image data by converting the externally received image data according to the data signal format used by the data driving circuit 130 to the data driving circuit 130. The controller 140 may receive various timing signals including vertical synchronizing signal (VSYNC), horizontal synchronizing signal (HSYNC), input data enable signal (DE), clock signal (CLK), and the like along with image data from the outside (e.g., a host system).

The controller 140 may generate various control signals using various timing signals received from the outside and output the control signals to the gate driving circuit 120 and the data driving circuit 130. For example, in order to control the gate driving circuit 120, the controller 140 may output various gate control signals GCS including a gate start pulse (GSP), a gate shift clock (GSC), and a gate output enable signal (GOE), etc. Here, the gate start pulse GSP may control the operation start timing of one or more gate driver integrated circuits (GDICs) constituting the gate driving circuit 120. The gate shift clock (GSC) is a clock signal commonly input to one or more gate driver integrated circuits (GDICs), and can control the shift timing of the scan signal. The gate output enable signal (GOE) may specify timing information of one or more gate driver integrated circuits (GDICs).

In addition, in order to control the data driving circuit 130, the controller 140 may output various data control signals DCS including a source start pulse (SSP), a source sampling clock (SSC), and a source output enable signal (SOE), etc. Here, the source start pulse (SSP) may control the data sampling start timing of one or more source driver integrated circuits (SDICs) constituting the data driving circuit 130. The source sampling clock (SSC) may be a clock signal that controls sampling timing of data in each of the source driver integrated circuits (SDICs). The source output enable signal (SOE) may control the output timing of the data driving circuit 130.

The display device 10 may further include a power management integrated circuit which supplies various voltages or currents to the display panel 100, the gate driving circuit 120, and the data driving circuit 130, or controls various voltages or currents to be supplied.

Figure 2:
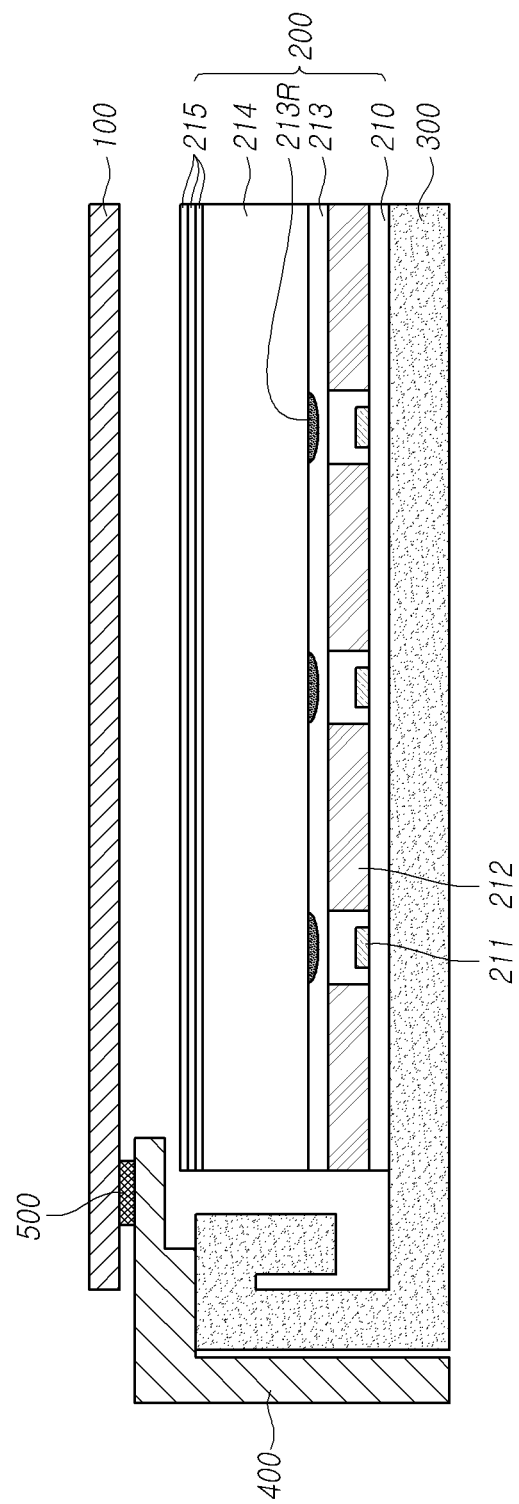
FIG. 2 is a partial cross-sectional view illustrating a part of the display device according to embodiments of the present invention.
Figure 3:
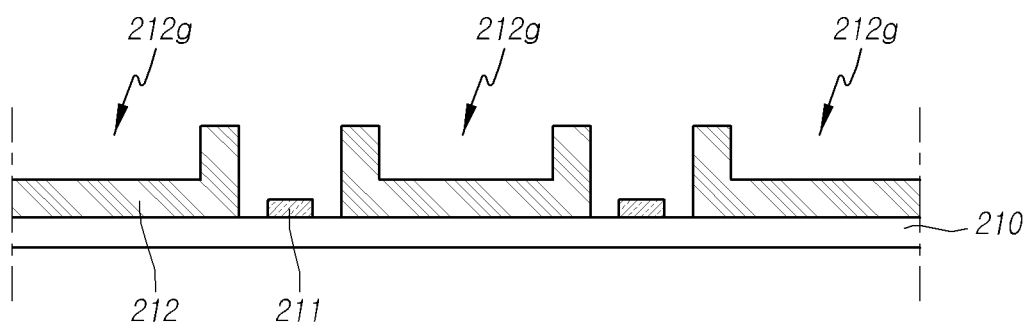
FIG. 3 is a partial cross-sectional view illustrating a substrate on which a plurality of light emitting elements and a reflector are disposed in a backlight unit according to an embodiment of the present invention.

FIG. 2 is a partial cross-sectional view illustrating a part of the display device according to embodiments of the present disclosure, and FIG. 3 is a partial cross-sectional view illustrating a substrate on which a plurality of light emitting elements and a reflector are disposed in a backlight unit according to an embodiment of the present invention.

Referring to FIGS. 2 and 3, the display device 10 according to embodiments of the present disclosure may include the display panel 100 and the backlight unit 200 disposed below the display panel 100 and supplying light to the display panel 100.

A plurality of structures may be disposed between the backlight unit 200 and the display panel 100. As an example, a guide panel 400 and a foam pad 500 may be included. The display panel 100 may be disposed on the backlight unit 200 by the guide panel 400 and the foam pad 500.

The display device 10 may include a cover bottom 300 that accommodates the backlight unit 200. The substrate 210 may be disposed on the cover bottom 300, and a plurality of light emitting elements 211 may be disposed on the substrate 210.

The substrate 210 may be a printed circuit board. The substrate 210 may be coated with a reflective film. The reflective film may include a white pigment. However, it is not limited thereto. The reflective film may reflect light irradiated to the substrate 210 in the direction of the display panel 100 or a transparent sheet 213, which will be described later, to further increase the light efficiency of the backlight unit 200.

The light emitting element 211 may be, for example, a light emitting diode (LED), or may be a small mini light emitting diode (Mini LED) or a small micro light emitting diode (μLED). In addition, the light emitting element 211 may have a flip chip structure.

The light emitting element 211 of the flip chip structure may be disposed in a form in which the chip type light emitting element 211 is mounted on the substrate 210, thereby reducing the thickness of the backlight unit 200 and providing a light source having a wide emission angle and a high light efficiency.

The light emitting element 211 may emit light in a white wavelength band, or in some cases, emit light in a specific wavelength band (e.g., blue wavelength band).

In addition, a reflector 212 may be disposed on the substrate 210. The reflector 212 may reflect light emitted from the light emitting elements 211 to increase light efficiency. The reflector 212 may include a plurality of grooves 212g each having a predetermined size formed on the upper surface of the reflector as shown in FIG. 3. The depth of the groove 212g may be at least 50 however, is not limited thereto. The reflector 212 may be white polyethylene terephthalate (PET).

The reflector 212 may include a plurality of protrusions protruding in the direction of the transparent sheet 213 from portions of the reflector adjacent to the plurality of light emitting elements 211, and the plurality of grooves 212g may be located between the plurality of protrusions.

In addition, the transparent sheet 213 may be disposed on the substrate 210 on which the plurality of light emitting elements 211 are disposed. The transparent sheet 213 may protect the plurality of light emitting elements 211 and may provide a function of diffusing light emitted from the light emitting elements 211. The transparent sheet 213 may include polymethyl methacrylate (PMMA), polycarbonate (PC), or glass, but is not limited thereto.

In addition, a plurality of optical path changing patterns 213R may be disposed on the upper surface of the transparent sheet 213. The optical path changing pattern 213R may be disposed at a position overlapping the light emitting element 211. The optical path changing pattern 213R may reflect a part of light emitted from the light emitting element 211. The other part of the light emitted from the light emitting element 211 may be absorbed by the optical path changing pattern 213R or transmitted through the optical path changing pattern 213R.

The light emitted from the light emitting element 211 may be reflected by the optical path changing pattern 213R, so that it is possible to suppress the occurrence of hot spots in the backlight unit 200 due to the light emitted vertically.

In addition, the occurrence of hot spots of the backlight unit 200 is suppressed, so that, in the backlight unit 200, it is possible to suppress the occurrence of mura, which is not uniform in the characteristics of the screen and is stained in the peripheral area of the light emitting element 211. Accordingly, the luminance of light emitted from the backlight unit 200 may be uniform.

In addition, the light emitted from the light emitting element 211 may be reflected by the optical path changing pattern 213R, the light path is converted in the direction of the substrate 210, and then may be reflected back by the reflector 212 to proceed in the direction of the display panel 100. At this time, since the light reflected from the optical path changing pattern 213R is incident on the reflector 212 in a diagonal direction, the light irradiated to the reflector 212 by the optical path changing pattern 213R and reflected back may pass through the transparent sheet 213 at a position remote from the light emitting element 211.

Accordingly, even when the distance between the adjacent light emitting elements 211 is large due to the small number of light emitting elements 211 disposed on the substrate 210 of the backlight unit 200, the amount of light irradiated to the region between the adjacent light emitting elements 211 may be increased by the optical path changing pattern 213R. Therefore, the luminance uniformity of the backlight unit 200 may be constant.

As a result, the number of light emitting elements 211 disposed in the backlight unit 200 can be reduced, so that the manufacturing cost of the backlight unit 200 can be reduced.

A diffusion plate 214 for diffusing the light incident from the bottom may be disposed on the transparent sheet 213. Then, one or more optical sheets 215 may be disposed on the diffusion plate 214. The structure disposed on the transparent sheet 213 is not limited thereto.

In addition, an adhesive film may be disposed on the transparent sheet 213. The adhesive film may be an optical clear adhesive (OCA) film. The diffusion plate 214 may be fixed on the transparent sheet 213 by the adhesive film.

Figure 4:
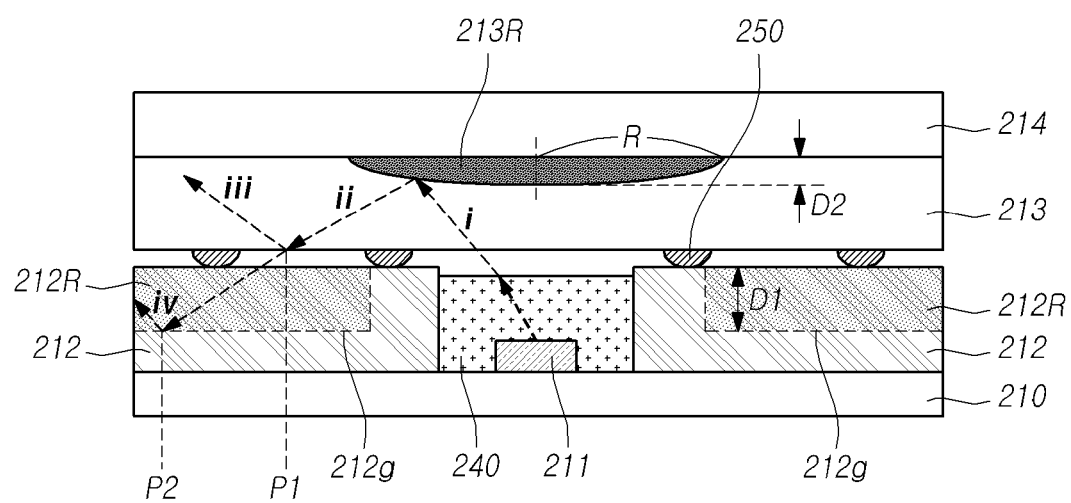
FIGS. 4 and 5 are partial cross-sectional views illustrating backlight units according to embodiments of the present invention.
Figure 5:
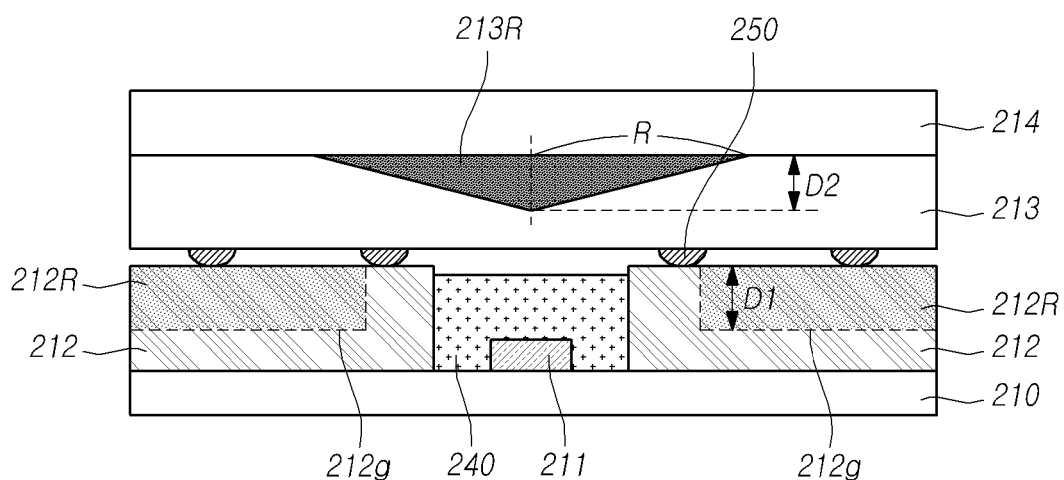
Figure 6:
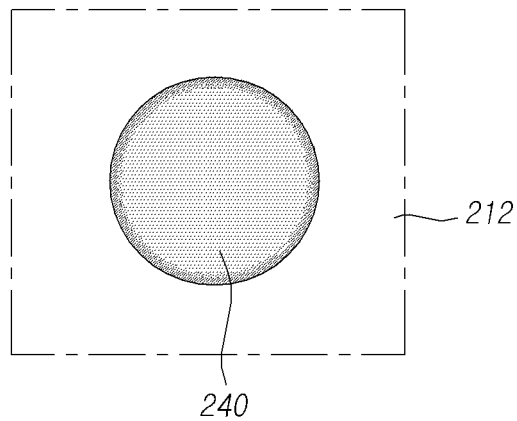
FIG. 6 is a partial plan view illustrating a part of the backlight unit.

FIGS. 4 and 5 are partial cross-sectional views illustrating backlight units according to embodiments of the present disclosure, and FIG. 6 is a partial plan view illustrating a part of the backlight unit.

Referring to FIGS. 4 and 5, the backlight unit 200 may include the plurality of light emitting elements 211 disposed on the substrate 210 and each having a flip chip structure, and the reflector 212 disposed between the plurality of light emitting elements 211 and having the plurality of grooves 212g each having a predetermined size on the upper surface of the reflector. In addition, the backlight unit 200 may include the transparent sheet 213 disposed on the reflector 212 and the plurality of light emitting elements 211, and the transparent sheet 213 may include the plurality of optical path changing patterns 213R each of which is disposed at a position overlapping each of the light emitting elements on an opposite side of a surface of the transparent sheet adjacent to the plurality of light emitting elements 211 and has a central region thicker than the outer region.

Alternatively, as illustrated in FIG. 4, the optical path changing patterns 213R may be formed on a surface of the transparent sheet adjacent to the diffusion plate 214 rather than a surface of the transparent sheet adjacent to the plurality of light emitting elements 211, but is not limited thereto.

The reflector 212 may include a plurality of reflector reinforcements 212R disposed in the plurality of grooves 212g disposed on the upper surface of the reflector. Also, the reflector reinforcement 212R may include resin. The height of the reflector 212 may be uniform by the plurality of reflector reinforcements 212R. The depth D1 of the groove 212g may be at least 50 μm. In addition, the reflector reinforcement 212R may include a material having a refractive index in the range of 1.4 to 1.6, however, is not limited thereto. In addition, the air layer may be disposed in the groove 212g disposed on the upper surface of the reflector 212 instead of the reflector reinforcement 212R formed of resin.

The transparent sheet 213 may include polymethyl methacrylate (PMMA), polycarbonate (PC), or glass. However, it is not limited thereto.

The light (i) having the first path emitted from the light emitting element 211 passes through the transparent sheet 213 and is reflected in the direction of the substrate 211 from the optical path changing pattern 213R to become the light (ii) having the second path. The optical path changing pattern 213R has a shape in which the thickness of the central region is greater than the thickness of the outer region, so that the light (ii) having the second path reflected from the optical path changing pattern 213R can be entered diagonally to the reflector 212.

The light (ii) having the second path may become the light (iii) having the third path reflected from the lower surface of the transparent sheet 213, and the light (iv) having the fourth path reflected from the boundary between the reflector 212 and the reflector reinforcement 212R by using the reflector reinforcement 212R disposed in the groove 212g of the reflector 212.

The light (iv) having the fourth path may pass through the reflector reinforcement 212R disposed on the reflector 212 and may be reflected at the boundary between the reflector 212 and the reflector reinforcement 212R of the reflector 212. Accordingly, the reflection point P2 at which the light (iv) having the fourth path is reflected may be farther away from the light emitting element 211 than the reflection point P1 at which the light (iii) having the third path is reflected. Therefore, light can travel to a position far from the light emitting element 211.

Therefore, even if the distance between the adjacent light emitting elements 211 is large, the amount of light irradiated to the region between the adjacent light emitting elements 211 may be increased by the optical path changing pattern 213R, so that the luminance uniformity of the backlight unit 200 may be constant.

In addition, a spacer 250 may be disposed between the transparent sheet 213 and the reflector 212 so that the distance between the transparent sheet 213 and the reflector 212 can be maintained over a predetermined distance.

As illustrated in FIG. 4, the optical path changing pattern 213R may be formed by forming a semi-spherical engraved groove in the transparent sheet 213, and filling the groove with a highly reflective material having high reflectance. Therefore, the optical path changing pattern 213R may have a constant curvature along which the thickness of the optical path changing pattern 213R is changed from the central region to the outer region. The highly reflective material may be a white-based UV curing type ink containing titanium oxide (TiO2) or a thermal curing type ink. However, the highly reflective material is not limited thereto. In addition, the reflectance of the highly reflective material may be 95% or more.

Alternatively, as shown in FIG. 5, in order to form the optical path changing pattern, the groove having a certain inclination may be formed in the transparent sheet 213. Accordingly, the optical path changing pattern 213R formed by filling the groove formed in the transparent sheet 213 with the highly reflective material having high reflectance may have a constant change in thickness from the central region to the outer region.

The maximum depth D2 of the engraved groove formed in the transparent sheet 213 may be between 1.5 and 1 mm, and the radius R of the groove may be determined by multiplying the distance between the light emitting element and the transparent sheet 213 by tan 60°. However, it is not limited thereto.

In addition, the backlight unit 200 may further include a color resin 240 disposed to overlap the light emitting elements 211 and surrounded by the reflector 212. The color resin 240 may have a circular shape as illustrated in FIG. 6. The light emitted from the light emitting element 211 may pass through the color resin 240 disposed at a position overlapping the light emitting element 211.

The color resin 240 may include a resin and a phosphor. The resin included in the color resin 240 may be a UV curing resin or a thermosetting resin. The phosphor may excite the incident light so as to emit the light in a specific wavelength band. Accordingly, the light passing through the color resin 240 may be a specific color included in the color resin 240 or a color mixed with a specific color. For example, when the light emitting element 211 emits light in the first wavelength band (e.g., blue light), the color resin 240 may emit the light in the second wavelength band (e.g., green light) and the light in the third wavelength band light (e.g., red light) in response to the incident light. Accordingly, in the case that the light emitting element 211 emits blue light, light emitted from the light emitting element 211 may pass through the color resin 240, and may be converted into white light and emitted.

In addition, the phosphor included in the color resin 240 may be yellow or green-red or yellow-red phosphor.

In addition, the diffusion plate 214 for diffusing the light incident from the bottom may be disposed on the transparent sheet 213.

As described above, embodiments of the present disclosure include the transparent sheet 213 including the optical path changing pattern 213R disposed at a position corresponding to the light emitting element 211, and various optical elements, thereby improving the image quality represented by the backlight unit 200 while reducing the thickness of the backlight unit 200.

Figure 7:
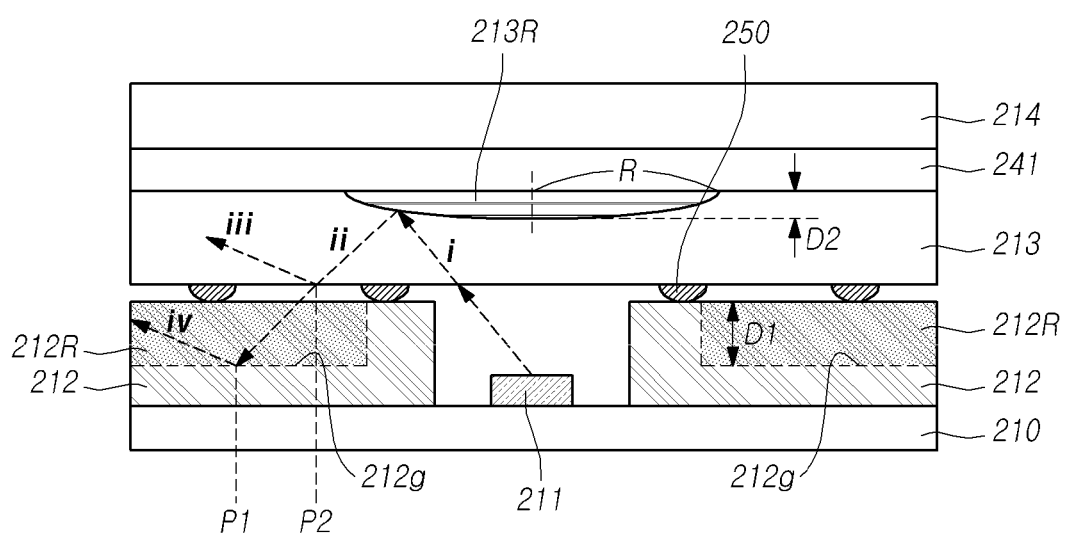
FIGS. 7 and 8 are partial cross-sectional views illustrating backlight units according to embodiments of the present invention.
Figure 8:
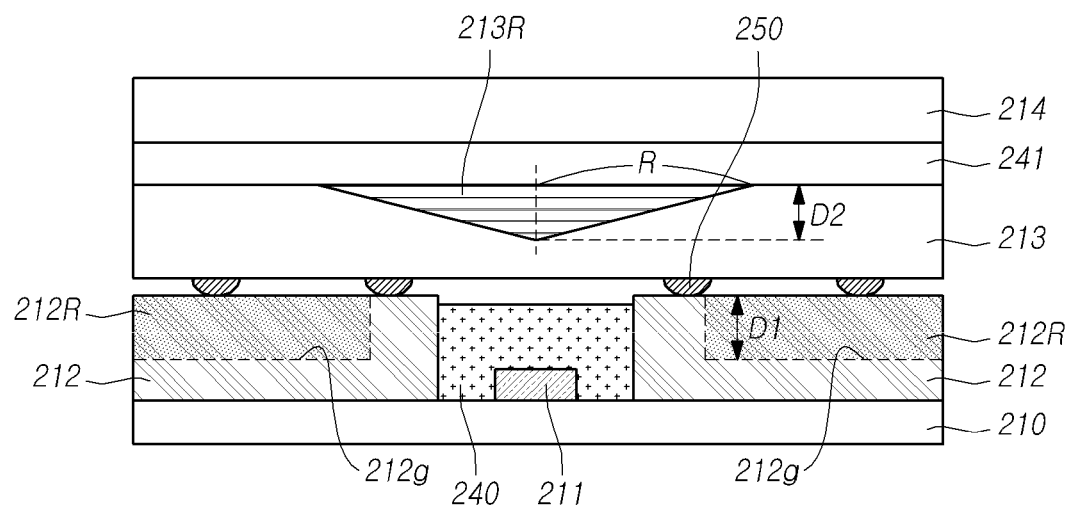

FIGS. 7 and 8 are partial cross-sectional views illustrating backlight units according to embodiments of the present invention.

Referring to FIGS. 7 and 8, the backlight unit 200 may include the plurality of light emitting elements 211 disposed on the substrate 210 and each having a flip chip structure, and the reflector 212 disposed between the plurality of light emitting elements 211 and having the plurality of predetermined grooves formed on the upper surface of the reflector. In addition, the backlight unit 200 may include the transparent sheet 213 disposed on the plurality of light emitting elements 211, and the transparent sheet 213 may include the plurality of optical path changing patterns 213R each of which is disposed at a position overlapping each of the light emitting elements on an opposite side of a surface of the transparent sheet adjacent to the plurality of light emitting elements 211 and has the thickness of the central region greater than the thickness of the outer region.

The reflector 212 may include the plurality of reflector reinforcements 212R disposed in the plurality of grooves 212g disposed on the upper surface of the reflector. Also, the reflector reinforcement 212R may include resin. The height of the reflector 212 may be uniform by the plurality of reflector reinforcements 212R. The depth D1 of the groove 212g may be at least 50 μm. In addition, the reflector reinforcement 212R may include a material having a refractive index in the range of 1.4 to 1.6, however, is not limited thereto. In addition, the air layer may be disposed in the groove 212g disposed on the upper surface of the reflector 212 instead of the reflector reinforcement 212R formed of resin.

The transparent sheet 213 may include polymethyl methacrylate (PMMA), polycarbonate (PC), or glass. However, it is not limited thereto.

The light (i) having the first path emitted from the light emitting element 211 passes through the transparent sheet 213 and is reflected in the direction of the substrate 210 from the optical path changing pattern 213R to become the light (ii) having the second path. The optical path changing pattern 213R has a shape in which the thickness of the central region is greater than the thickness of the outer region. The light (ii) having the second path reflected from the optical path changing pattern 213R can be entered diagonally to the reflector 212.

The light (ii) having the second path may become the light (iii) having the third path reflected from the lower surface of the transparent sheet 213, and the light (iv) having the fourth path reflected from the boundary between the reflector 212 and the reflector reinforcement 212R by using the reflector reinforcement 212R disposed in the groove 212g of the reflector 212.

The light (iv) having the fourth path may pass through the reflector reinforcement 212R disposed on the reflector 212 and may be reflected at the boundary between the reflector 212 and the reflector reinforcement 212R of the reflector 212. Accordingly, the reflection point P2 at which the light (iv) having the fourth path is reflected may be farther away from the light emitting element 211 than the reflection point P1 at which the light (iii) having the third path is reflected. Therefore, light can travel to a position far from the light emitting element 211.

Therefore, even if the distance between the adjacent light emitting elements 211 is large, the amount of light irradiated to the region between the adjacent light emitting elements 211 may be increased by the optical path changing pattern 213R, so that the luminance uniformity of the backlight unit 200 may be constant.

In addition, the spacer 250 may be disposed between the transparent sheet 213 and the reflector 212 so that the distance between the transparent sheet 213 and the reflector 212 can be maintained over a predetermined distance.

As illustrated in FIG. 7, the optical path changing pattern 213R may be formed by forming a semi-spherical engraved groove in the transparent sheet 213 and disposing the reflection filter reflecting light having the first wavelength emitted from the light emitting element 211 in the groove. Therefore, the reflection filter may have a constant curvature along which the thickness of the reflection filter is changed from the central region to the outer region. The reflection filter may be formed by stacking the highly reflective material reflecting light having the first wavelength in the semi-spherical engraved groove. The reflection filter may be formed by stacking a plurality of reflection layers including the highly reflective material. The highly reflective material may include polyethylene terephthalate (PET). In addition, the reflection layer may include PET, and the reflection filter may be formed by stacking reflection layers containing PET.

In addition, a part of the light having the first wavelength emitted from the light emitting element 211 may be reflected in the first reflection layer and the other part may pass through the first reflection layer. Light passing through the first reflection layer may be partially reflected by the second reflection layer and the other part may pass through the second reflection layer. Finally, the reflection filter may cause light having the first wavelength emitted from the light emitting element 211 to be reflected in the direction of the reflector 212.

In this case, the thickness and refractive index of the plurality of reflection layers stacked and disposed in the reflection filter may be the same or different from each other. In addition, the highly reflective material may include PC (Poly carbonate), PMMA (Poly methyl methacrylate), however, is not limited thereto.

In addition, in the optical path changing pattern 213R as shown in FIG. 8, each of the grooves formed in the transparent sheet 213 may be formed to have a certain slope. Therefore, the optical path changing pattern 213R formed by stacking the highly reflective material reflecting light having the first wavelength in the groove formed in the transparent sheet 213 may have a constant change in thickness from the central region to the outer region.

The maximum depth D2 of the groove formed in the transparent sheet 213 may be between 0.5 and 1 mm, and the radius R of the groove may be determined by multiplying the distance between the light emitting element and the transparent sheet 213 by tan 60°. However, it is not limited thereto.

In addition, the phosphor sheet 241 may be disposed on the transparent sheet 213. The phosphor sheet 241 may include a phosphor. Further, the phosphor may be excited by light emitted from the light emitting element 211 to emit light. The light emitted from the light emitting element 211 and the light emitted from the phosphor of the phosphor sheet 241 may be mixed to become white light. For example, when the light emitting element 211 emits light in the first wavelength band (e.g., blue light), the phosphor sheet 241 may react to the incident light so as to emit the light in the second wavelength band (e.g., green light) and the light in the third wavelength band (e.g., red light). Accordingly, in the case that the light emitting element 211 emits blue light, when light emitted from the light emitting element 211 passes through the phosphor sheet 241, it may be converted into white light and emitted.

In addition, the phosphor included in the phosphor sheet 241 may be yellow, green-red or yellow-red phosphor.

In addition, the phosphor sheet 241 may be disposed in some areas on the diffusion plate 214.

As described above, embodiments of the present disclosure include the transparent sheet 213 including the optical path changing pattern 213R disposed at a position corresponding to the light emitting element 211, and various optical elements, thereby improving the image quality represented by the backlight unit 200 while reducing the thickness of the backlight unit 200.

Figure 9A:
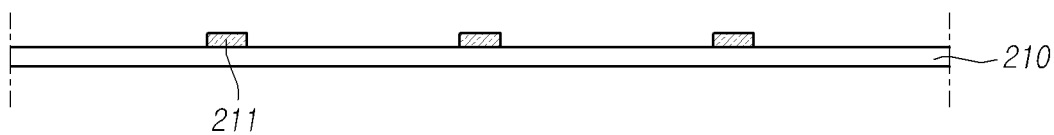
FIGS. 9A to 9C are diagrams illustrating a process of forming the backlight unit shown in FIG. 2.
Figure 9B:
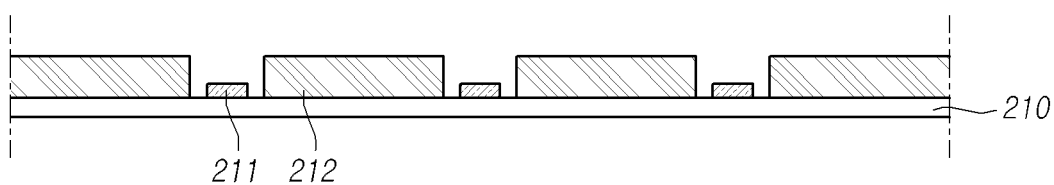
Figure 9C:
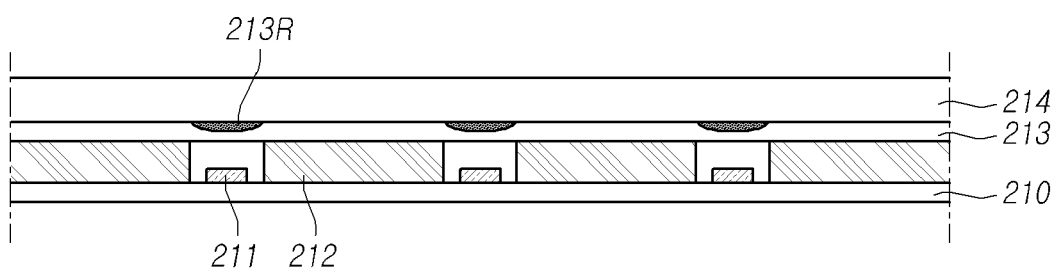

FIGS. 9A to 9C are diagrams illustrating a process of forming the backlight unit shown in FIG. 2.

Referring to FIGS. 9A to 9C, the plurality of light emitting elements 211 may be disposed on the substrate 210. The reflective film may be coated and disposed on the substrate 210. The coated reflective film may include the white pigment. That is, the surface of the substrate 210 may be white.

In addition, the reflector 212 may be disposed on at least some of the regions except the region in which the light emitting element 211 is disposed on the substrate 210.

The reflector 212 may be formed in an area in which a subarea corresponding to the light emitting element 211 is opened and may be disposed on the substrate 210. In addition, the reflector 212 may reflect light emitted from the light emitting element 211 to the front surface of the backlight unit 200 to increase the light efficiency of the backlight unit 200.

In the case that the light emitting element 211 is disposed in the form of the chip, the light emitting element 211 may be implemented small, so that the height of the reflector 212 may be greater than the height of the light emitting element 211.

Accordingly, light emitted in the lateral direction of the light emitting element 211 may be reflected from the side of the reflector 212 and may be emitted to the front surface of the backlight unit 200, thereby further improving the light efficiency of the backlight unit 200.

The reflector 212 may include the plurality of grooves formed in the upper surface thereof. Further, the resin 212R may be disposed in the groove 212g formed on the upper surface of the reflector 212.

In addition, the transparent sheet 213 may be disposed on the plurality of light emitting elements 211 and the reflector 212. The transparent sheet 213 may include polymethyl methacrylate (PMMA), polycarbonate (PC), or glass, but is not limited thereto.

The transparent sheet 213 may include the plurality of optical path changing patterns 213R each disposed at a position overlapping with the light emitting element 211. The hot spots may be prevented from being generated in the backlight unit 200 by the optical path changing patterns 213R.

The transparent sheet 213 may serve to protect the plurality of light emitting elements 211 disposed on the substrate 210, and may also provide the function of the light guide plate by diffusing light emitted from the light emitting elements 211. Therefore, the light emitted from the light emitting element 211 can be spread evenly to the upper surface of the transparent sheet 213 by the transparent sheet 213. At this case, even if the reflector 212 adjusts the traveling direction of light by the transparent sheet 213 or the like, the intensity of light emitted in the vertical direction of the light emitting element 211 may be large, and accordingly, the uniformity of luminance may be reduced.

In embodiments of the present disclosure, the optical path changing pattern 213R may be disposed at a position corresponding to the light emitting element 211 on the upper surface of the transparent sheet 213, thereby reducing the thickness of the backlight unit 200 while improving the uniformity of luminance of the display panel 100.

The plurality of optical path changing patterns 213R may be disposed on the upper surface of the transparent sheet 213. However, the present disclosure is not limited thereto, and the plurality of optical path changing patterns 213R may be disposed on the lower surface of the transparent sheet 213. Also, the spacer 250 may be disposed between the transparent sheet 213 and the reflector 212.

Each of the plurality of optical path changing patterns 213R disposed on the lower surface or the upper surface of the transparent sheet 213 may be located to correspond to each of the plurality of light emitting elements 211 disposed on the substrate 210. For example, the optical path changing pattern 213R may be arranged such that at least a portion of the optical path changing pattern 213R overlaps with the light emitting element 211, and when considering diffusion characteristics of light, the optical path changing pattern 213R may be disposed to overlap the region including the region where the light emitting element 211 is disposed.

The optical path changing pattern 213R may reflect light emitted from the light emitting element 211. In addition, the optical path changing pattern 213R may reflect light emitted in the vertical direction from the light emitting element 211 and may make it be reflected again by the reflector 212 so that may make the light emit to the region between the adjacent light emitting elements 211.

As described above, the light emitted from the light emitting element 211 is reflected by the optical path changing pattern 213R and the reflector 212, thereby improving the image quality of the backlight unit 200.

In addition, the color resin 212R may be disposed and surrounded by the reflector 212 at a position overlapping with the light emitting element 211. The color resin 212R may make light emitted from the light emitting element 211 become white light.

The diffusion plate 214 may be disposed on the transparent sheet 213. In addition, the phosphor sheet 241 may be disposed between the transparent sheet 213 and the diffusion plate 214. However, the present disclosure is not limited thereto, and the phosphor sheet 241 may be disposed on the diffusion plate 214.

The phosphor sheet 241 may include the phosphor having a specific color, and may excite incident light to emit light in a specific wavelength band. Therefore, the light passing through the phosphor sheet 241 may be a specific color included in the phosphor sheet 241 or a color mixed with a specific color. For example, when the light emitting element 211 emits light in the first wavelength band (e.g., blue light), the phosphor sheet 241 may react to incident light and emit the light in the second wavelength band (e.g., green light) and the light in the third wavelength band light (e.g., red light). Accordingly, in the case that the light emitting element 211 emits blue light, when light emitted from the light emitting element 211 passes through the phosphor sheet 241, it may be converted into white light and be emitted.

In addition, one or more optical sheets 215 may be disposed on the phosphor sheet 241.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit, comprising:
a plurality of light emitting elements disposed on a substrate, each of the plurality of light emitting elements having a flip chip structure;
a reflector disposed between respective adjacent light emitting elements of the plurality of light emitting elements, the reflector having a plurality of first grooves, each of the plurality of first grooves having a predetermined size disposed on a respective upper surface of the reflector; and
a transparent sheet disposed on the reflector and the plurality of light emitting elements, the transparent sheet including a plurality of optical path changing patterns, each of the plurality of optical path changing patterns disposed at a position overlapping a respective light emitting element of the plurality of light emitting elements on an opposite side of a surface of the transparent sheet adjacent to the plurality of light emitting elements, each of the plurality of optical path changing patterns having a first thickness at a central region being greater than a second thickness at an outer region.

2. The backlight unit of claim 1, wherein the reflector includes a resin disposed in the plurality of first grooves.

3. The backlight unit of claim 1, wherein the reflector includes a plurality of protrusions protruding from portions of the reflector adjacent to the plurality of light emitting elements in a first direction toward the transparent sheet, and each of the plurality of first grooves is positioned between respective adjacent protrusions of the plurality of protrusions.

4. The backlight unit of claim 1, wherein a first optical path changing pattern of the optical path changing patterns includes a white ink disposed in a second groove formed at a position on the transparent sheet overlapping with the respective light emitting element, the second groove having a first depth at a central region of the second groove being greater than a second depth at an outer region of the second groove.

5. The backlight unit of claim 1, wherein a first optical path changing pattern of the optical path changing patterns includes a reflection filter reflecting light having a first wavelength emitted from the respective light emitting element, the reflection filter being disposed in a second groove formed at a position on the transparent sheet overlapping with the respective light emitting element, the second groove having a first depth at a central region of the second groove being greater than a second depth at an outer region of the second groove.

6. The backlight unit of claim 5, wherein the reflection filter includes a plurality of reflection layers including highly reflective materials, and each of the reflection layers has a thickness different from each other.

7. The backlight unit of claim 1, wherein a first optical path changing pattern of the optical path changing patterns has a constant curvature between the first thickness at the central region and the second thickness at the outer region or the first optical path changing pattern of the optical path changing patterns has a constant change in thickness from the central region to the outer region.

8. The backlight unit of claim 1, further comprising a color resin disposed to overlap the plurality of light emitting elements and surrounded by the reflector.

9. The backlight unit of claim 5, further comprising a phosphor sheet disposed on the transparent sheet and an optical sheet disposed on the phosphor sheet.

10. The backlight unit of claim 2, wherein a spacer is disposed between the transparent sheet and the reflector.

11. A display device, comprising:
a display panel; and
a backlight unit disposed under the display panel and configured to emit light to the display panel,
wherein the backlight unit includes:
a plurality of light emitting elements disposed on a substrate, each of the plurality of light emitting elements having a flip chip structure;
a reflector disposed between respective adjacent light emitting elements of the plurality of light emitting elements, the reflector having a plurality of first grooves, each of the plurality of first grooves having a predetermined size disposed on a respective upper surface of the reflector; and
a transparent sheet disposed on the reflector and the plurality of light emitting elements, the transparent sheet including a plurality of optical path changing patterns, each of the plurality of optical path changing patterns disposed at a position overlapping a respective light emitting element of the plurality of light emitting elements on an opposite side of a surface of the transparent sheet adjacent to the plurality of light emitting elements, each of the plurality of optical path changing patterns having a first thickness at a central region being greater than a second thickness at an outer region.

12. The display device of claim 11, wherein the reflector includes a resin disposed in the plurality of first grooves.

13. The display device of claim 11, wherein the reflector includes a plurality of protrusions protruding from portions of the reflector adjacent to the plurality of light emitting elements in a first direction toward the transparent sheet, and each of the plurality of first grooves is positioned between respective adjacent protrusions of the plurality of protrusions.

14. The display device of claim 11, wherein a first optical path changing pattern of the optical path changing patterns includes a white ink disposed in a second groove formed at a position on the transparent sheet overlapping with the respective light emitting element, the second groove having a first depth at a central region of the second groove being greater than a second depth at an outer region of the second groove.

15. The display device of claim 11, wherein a first optical path changing pattern of the optical path changing patterns includes a reflection filter reflecting light having a first wavelength emitted from the respective light emitting element, the reflection filter being disposed in a second groove formed at a position on the transparent sheet overlapping with the respective light emitting element, the second groove having a first depth at a central region of the second groove being greater than a second depth at an outer region of the second groove.

16. The display device of claim 15, wherein the reflection filter includes a plurality of reflection layers including highly reflective materials, and each of the reflection layers has a thickness different from each other.

17. The display device of claim 11, wherein a first optical path changing pattern of the optical path changing patterns has a constant curvature between the first thickness at the central region and the second thickness at the outer region or the first optical changing pattern of the optical path changing patterns has a constant change in thickness from the central region to the outer region.

18. The display device of claim 11, further comprising a color resin disposed to overlap the plurality of light emitting elements and surrounded by the reflector.

19. The display device of claim 15, further comprising a phosphor sheet disposed on the transparent sheet and an optical sheet disposed on the phosphor sheet.

20. The display device of claim 12, wherein a spacer is disposed between the transparent sheet and the reflector.

* * * * *